United States Patent
Grylls et al.

(10) Patent No.: US 6,378,755 B1
(45) Date of Patent: Apr. 30, 2002

(54) JOINED STRUCTURE UTILIZING A CERAMIC FOAM BONDING ELEMENT, AND ITS FABRICATION

(75) Inventors: Richard John Grylls; Curtiss Mitchell Austin, both of Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/708,749

(22) Filed: Nov. 8, 2000

(51) Int. Cl.[7] .......................... B23K 31/02; B23K 20/00
(52) U.S. Cl. ...................................... 228/122.1; 228/194
(58) Field of Search .......................... 228/122.1, 123.1, 228/124.1, 124.5, 248.1, 248.5, 256, 245, 199, 194, 195; 29/889–889.722

(56) References Cited

U.S. PATENT DOCUMENTS

| | | | |
|---|---|---|---|
| 4,055,451 A | * 10/1977 | Cockbain et al. | |
| 4,568,586 A | * 2/1986 | Gobrecht | |
| 4,580,714 A | * 4/1986 | Mayer et al. | 228/121 |
| 4,673,435 A | 6/1987 | Yamaguchi et al. | 75/235 |
| 4,729,504 A | * 3/1988 | Edamura | 228/122.1 |
| 4,857,411 A | * 8/1989 | Yamaguchi et al. | 228/122.1 |
| 5,011,063 A | * 4/1991 | Claar | |
| 5,043,229 A | * 8/1991 | Mizuhara | |
| 5,154,425 A | * 10/1992 | Niskanen et al. | |
| 5,161,728 A | * 11/1992 | Li | |
| 5,163,499 A | * 11/1992 | Kewkirk et al. | |
| 5,188,164 A | * 2/1993 | Kantner et al. | |
| 5,214,011 A | 5/1993 | Breslin | 501/127 |
| 5,230,924 A | * 7/1993 | Li | |
| 5,236,151 A | * 8/1993 | Hagle et al. | |
| 5,308,422 A | * 5/1994 | Askay et al. | |
| 5,400,947 A | * 3/1995 | Wang et al. | |
| 5,420,085 A | * 5/1995 | Newkirk et al. | |
| 5,447,291 A | * 9/1995 | Sandhage | |
| 5,518,061 A | 5/1996 | Newkirk et al. | 164/97 |
| 5,702,542 A | * 12/1997 | Brown et al. | |
| 5,728,638 A | 3/1998 | Strange et al. | 501/127 |
| 5,900,277 A | * 5/1999 | Fox et al. | |
| 5,985,464 A | * 11/1999 | Schmitt et al. | |
| 6,328,198 B1 | * 12/2001 | Ohashi et al. | 228/121 |

* cited by examiner

Primary Examiner—Tom Dunn
Assistant Examiner—Kiley Stoner
(74) Attorney, Agent, or Firm—David L. Narciso; Gregory O. Garmong

(57) ABSTRACT

A joined structure includes a structure made of a structure metal, and a bonding element having a portion made of an open-cell solid ceramic foam. The open-cell solid ceramic foam has ceramic first-portion cell walls, and an intracellular volume therebetween that is filled with a bonding-element metal. A joint between the structure and the bonding element has an interdiffusion between the structure metal and the bonding element metal. A second structure may be joined to the first structure through the bonding element, using the same approach. The joints are formed by contacting the structure to the bonding element, and interdiffusing the metals on each side of the joint.

20 Claims, 2 Drawing Sheets

JOINED STRUCTURE UTILIZING A CERAMIC FOAM BONDING ELEMENT, AND ITS FABRICATION

This invention relates to the joining of structures and, more particularly, to the joining achieved by metallic interdiffusion using a non-deforming ceramic-foam bonding element.

BACKGROUND OF THE INVENTION

Complex structures require that smaller individual components and subassembly structures be joined together. A wide variety of joining techniques exist, including mechanical joining and metallurgical joining. Mechanical joining includes techniques such as mechanical interlocks, mechanical fasteners, and adhesive bonding. Metallurgical joining includes techniques such as soldering, brazing, welding, and diffusion bonding. The selection of a joining technique to be used in a particular circumstance is made based a number of factors including the materials to be joined, structural requirements, service requirements, and permanency requirements.

Metallurgical joining techniques have advantages over mechanical joining techniques in some applications. The metallurgical joining techniques have the potential for achieving a permanent joint of equal strength to the base metals and with essentially no added weight or mechanical complexity. Brazing and soldering are limited in the temperature capability of the final joined structure. Diffusion bonding is an attractive possibility that is applied in some limited circumstances, but many combinations of materials cannot be interdiffused in the solid state to achieve the diffusion bond.

Liquid phase joining techniques such as welding may be used. However, some materials are chemically and physically incompatible so that they cannot be joined by high-temperature joining techniques such as welding. Welding also may adversely affect the metallurgical microstructures in the volumes adjacent to the weld, and result in a volume around the weld that cannot be properly heat treated or otherwise processed to have optimal properties. Locally melting the areas to be joined and then forcing the areas together, as in induction-heated, inertia, and friction welding, has some applications but is limited due to geometrical constraints and the inability to hold tight tolerances during the period that the local areas are melted.

The present inventors are concerned with producing joined structures for use in gas turbine engines. Tight tolerances and alignments must be maintained in metallurgical joints for these applications, and in many cases the geometries of the structures to be joined are not amenable to the use of conventional metallurgical joining techniques. There is therefore a need for an improved joining approach to be used in these and other applications. The present invention fulfills this need, and further provides related advantages.

BRIEF SUMMARY OF THE INVENTION

The present invention provides a method for joining structures with a metallurgical bond. The metals facing the joint are melted to achieve rapid, thorough interdiffusion and bonding at the joint. Even though the joint is melted, tolerances and structural alignments are preserved. The present approach may be used in a variety of applications and has wide flexibility to join structures of differing metallic compositions.

A joining method comprises the steps of furnishing a first structure comprising a first-structure metal, and providing a bonding element having a first portion formed of a first open-cell solid ceramic foam. The first open-cell solid ceramic foam comprises ceramic first-portion cell walls, and an intracellular first-portion volume therebetween. The intracellular first-portion volume is filled with a bonding-element first-portion metal. Preferably, the intracellular first-portion volume comprises at least about 20 percent by volume of the first portion of the bonding element.

The method further includes joining the first structure to the bonding element. The step of joining includes the substeps of contacting together the first structure and the first portion of the bonding element at a first bonding temperature greater than a solidus temperature of at least one of the first-structure metal and the bonding-element first-portion metal, and simultaneously interdiffusing the first-structure metal and the bonding-element first-portion metal to form a joined structure. The joined structure is thereafter cooled to room temperature. Preferably, the first bonding temperature is greater than the solidus temperatures of both the first-structure metal and the bonding-element first-portion metal, so that the metal on both sides of the joint is melted.

In the application of particular interest, the first-structure metal and the bonding-element first-portion metal are each nickel-base superalloys. Most preferably, the first-structure metal and the bonding-element first-portion metal are of substantially the same composition.

The joining method may also be extended to joining a second structure, comprising a second-structure metal, to the first structure. The method includes providing the bonding element having a second portion formed of a second open-cell solid ceramic foam comprising ceramic second-portion cell walls, and an intracellular second-portion volume therebetween. The intracellular second-portion volume is filled with a bonding-element second-portion metal. The method includes joining the second structure to the bonding element. The step of joining includes the substeps of contacting together the second structure and the second portion of the bonding element at a second bonding temperature greater than a solidus temperature of at least one of the second-structure metal and the bonding-element second-portion metal, and simultaneously interdiffusing the first-structure metal and the bonding-element first-portion metal to form a joined structure. Thereafter the joined structure is cooled to room temperature. The two stages of joining the first structure to the bonding element, and joining the second structure to the bonding element, may be accomplished simultaneously or sequentially.

The present approach is based on the use of a ceramic foam bonding element. The ceramic foam is formed of the internally continuous network of ceramic cell walls that serves as a skeleton, with the internally continuous intracellular volume between the ceramic cell walls. The intracellular volume is filled with a-metal. The ceramic cell walls retain their strength even when the metal is melted. Consequently, when the bonding element is pressed against a surface of the structure to which it is to be joined and the intracellular metal is melted, the bonding element retains its shape because of the ceramic skeleton. The intracellular metal that faces the structure to be bonded is interdiffused with the metal of the structure, leading to a strong metallurgical bond.

The ceramic foam bonding element is prepared by providing a piece of a sacrificial ceramic having the shape of the bonding element, and contacting (preferably by immersion)

the piece of the sacrificial ceramic to a reactive metal which reacts with the sacrificial ceramic to form an oxidized ceramic of the reactive metal and a reduced form of the ceramic. The resulting structure comprises the open-cell ceramic foam of the oxidized ceramic compound of the reactive metal with continuous ceramic cell walls and the continuous intracellular volume between the ceramic cell walls having a metallic reaction product therein. The metallic reaction product may be the same as the desired bonding-element first-portion metal. If not, the metallic reaction product may be replaced with the bonding-element first-portion metal.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
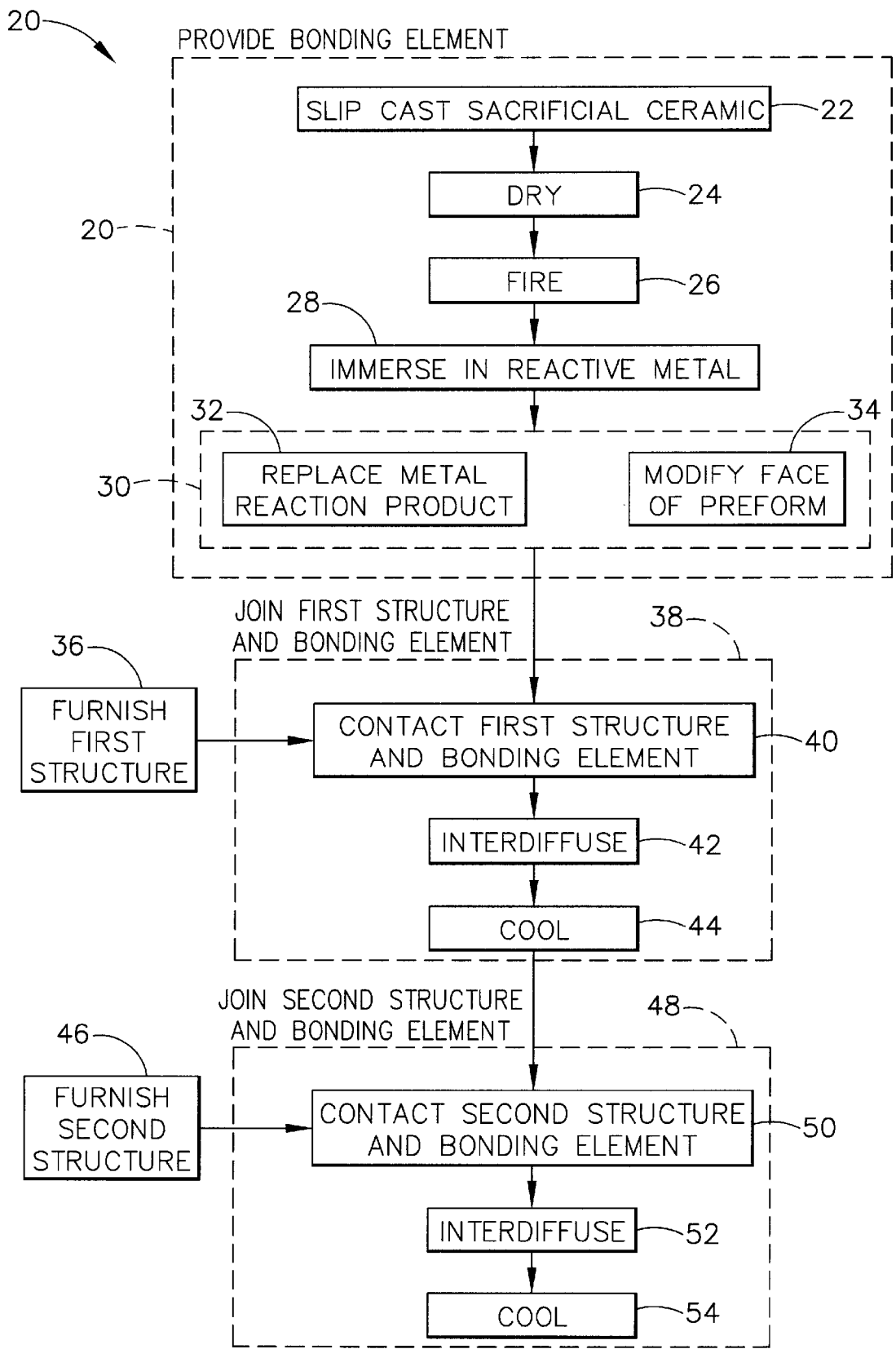
FIG. 1 is a block flow diagram of an approach for practicing the present invention.
Figure 2:
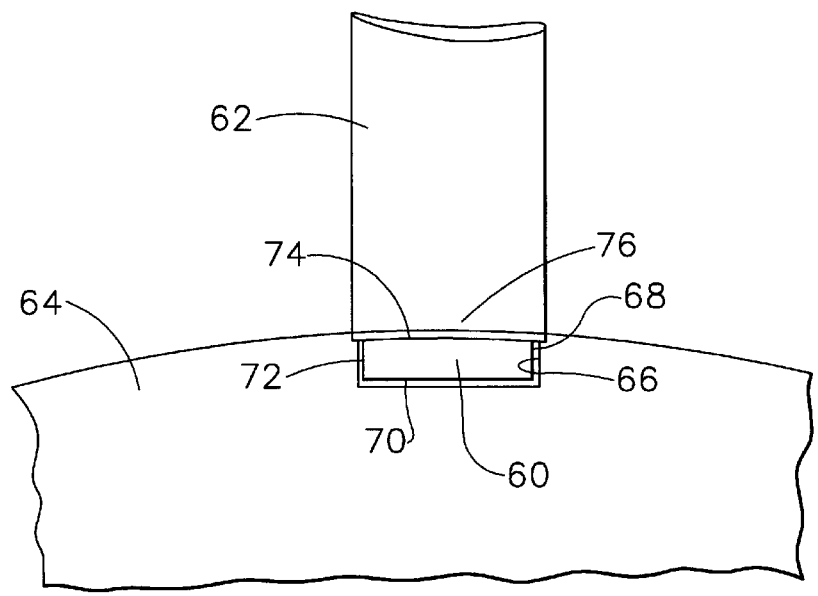
FIG. 2 is a schematic view of structures being joined through a bonding element.

FIG. 1 depicts a preferred approach for practicing the invention. A bonding element is provided, numeral 20. The bonding element has a shape and size as required for the intended application. Illustrating one application of interest, FIG. 2 shows a bonding element 60 used to attach a blade 62, which may be a turbine blade or a compressor blade, to the corresponding disk 64. This bonding element 60 is shaped and sized to be received within a recess 66 at the periphery of the disk 64. During subsequently described bonding operations, the bonding element 60 is bonded on three faces 68, 70 and 72 to the disk 64, and on a fourth face 74 to a root 76 of the blade 62. By this approach, the blade 62 may be fabricated separately from the disk 64 and thereafter metallurgically bonded to the disk 64.

The bonding element is preferably prepared by first fabricating a sacrificial ceramic form. The sacrificial ceramic form is prepared by an operable approach, and a preferred approach is illustrated in FIG. 1. In this preferred approach, a slip of a sacrificial ceramic material is prepared and cast into a mold that has the same shape, but slightly larger dimensions, than the required dimensions of the bonding element, numeral 22. The preferred sacrificial ceramic material is silica (silicon dioxide, $SiO_2$). Additions of modifiers may be made to the ceramic slip. For example, additions that modify the firing behavior of the ceramic, such as calcia (calcium oxide) in the case of silica sacrificial ceramic, may be made. Additions that modify the porosity of the final reacted ceramic material, such as mullite, may be made. Additions that modify the properties of the final reacted ceramic material, such as boron nitride or sol gel alumina to increase the wear resistance of the final reacted ceramic material, may be made. Additions that modify the chemical composition of the final reacted ceramic, such as boron, may be made.

The slip casting of silica particles is well known in other applications, and the same procedures are used here. Typically, a slurry of silica particles and acrylic binder in water is prepared and poured into the mold. The mold and its contents are dried, numeral 24, to remove the carrier liquid. The dried slip cast material is thereafter heated to an elevated temperature to fire and fuse the ceramic, numeral 26. In the case of silica, a typical firing temperature is about 2000° F. and a firing time is about 4 hours. The original slip casting is made slightly oversize to account for the shrinkage during drying and firing. The required oversize is known in the art because slip casting is so widely employed for other applications, but is typically about 1–15 percent.

The sacrificial ceramic form is thereafter contacted to a molten reactive metal, preferably by immersion of the sacrificial ceramic form into the molten reactive metal, numeral 28. The molten reactive metal is preferably an aluminum-base metal. The preferred approach is disclosed in U.S. Pat. Nos. 5,214,011 and 5,728,638, whose disclosures are incorporated by reference. The metal may be a pure metal, or it may be an alloy containing the reactive metal. Most preferably, the reactive metal, when in alloy form, contains more of the reactive element than any other element. The reactive metal may optionally be mixed with nonreactive metals such as a large fraction of nickel and other elements of the nickel-base alloy of interest for some applications, as disclosed in the '638 patent.

While the sacrificial ceramic form is immersed in the reactive metal, the ceramic of the sacrificial ceramic form is chemically reduced and the reactive metal is chemically oxidized. (Reduction and oxidation are broadly interpreted in the sense of electron transfer.) The reactive metal becomes an oxide or oxidized form, aluminum oxide in the preferred case. As a result of a mechanism involving volume changes and internal fracturing and discussed in the '011 patent, the foam or sponge structure is formed throughout the sacrificial ceramic as it transforms from the sacrificial form-composition to the final composition. The intracellular volume that results is filled with the reaction-product metal resulting from the reaction process. The result of the immersion step 28 is a reacted ceramic foam bonding element preform.

Figure 3:
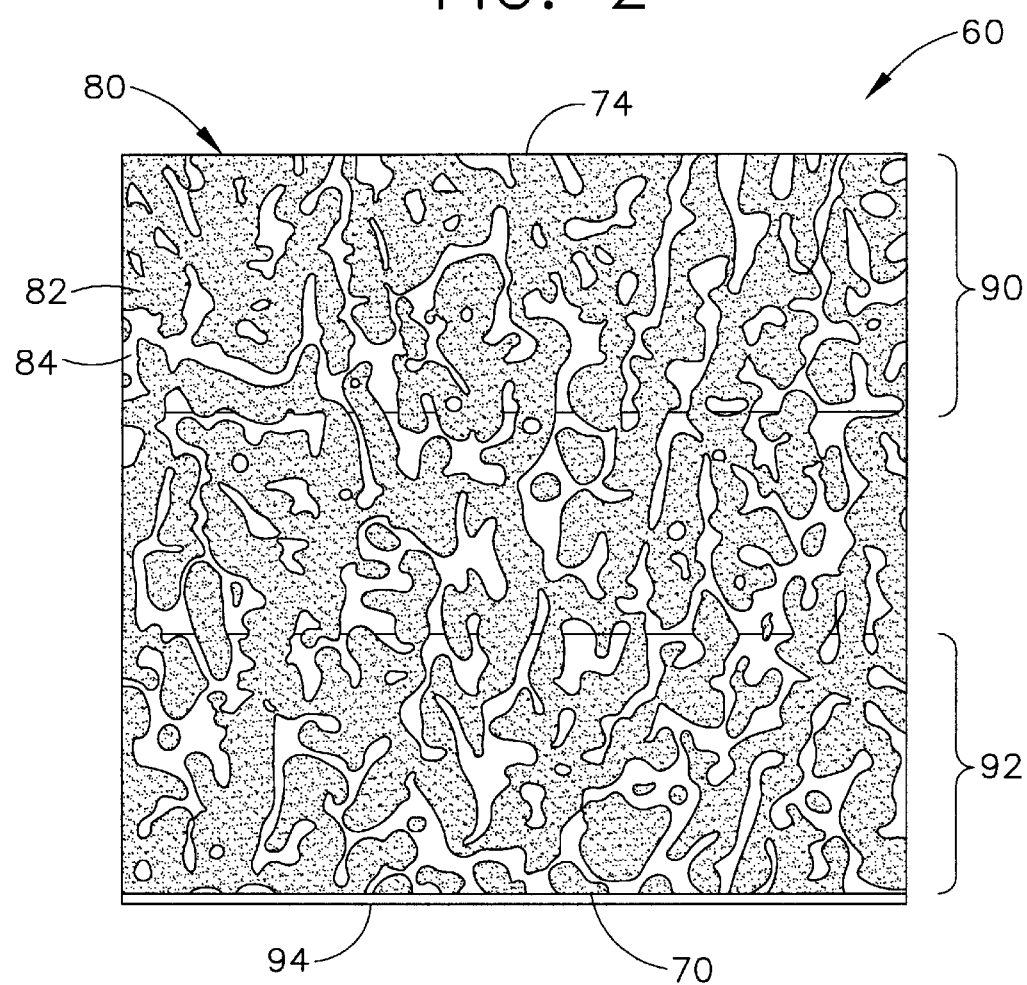
FIG. 3 is an idealized microstructure of the open-cell ceramic foam material used as the bonding element.

The foam material 80 is shown in FIG. 3. The open-cell solid foam material 80 comprises two interpenetrating, continuous regions 82 and 84. The region 82 comprises cell walls formed of a ceramic reaction product of the reaction between the sacrificial ceramic and the reactive metal. The intracellular region 84 is a metallic material. In the preferred case where the sacrificial ceramic is silica and the reactive metal is an aluminum-base metal, the region 82 is alumina (plus any modifiers that were added to the original sacrificial ceramic and remain). The intracellular region 84 is an aluminum-base metal that is a reaction product that will, in general, have a different composition than that of the initial reactive metal. The intracellular region 84 preferably occupies at least 20 percent by volume of the foam material 80, preferably from about 20 to about 40 percent by volume of the foam material 80. The region 82 occupies the remainder of the volume of the foam material 80.

Although it cannot be readily discerned from FIG. 3, the region 82 is internally continuous within itself, and the intracellular region 84 is internally continuous within itself. All portions of either region are respectively continuous, so that there is a continuous path from the external surfaces to any location within either phase. A consequence of this structure is that either the region 82 or the region 84, or both regions 82 and 84, may be modified to improve the bondability of the bonding element, numeral 30. The step 30, if performed, occurs after the immersion step 28 and before subsequent bonding steps.

Two modification techniques are of particular interest. In one, all or part of the reaction-product metal in the intracellular region 84 is replaced with another metal to improve the bondability and performance of the bonding element, numeral 32. The reaction-product metal in the intracellular region may be replaced with a metal that is more closely similar to that of the structures to be bonded, nickel-base superalloys in the case of the application pictured in FIG. 2. In the preferred case, where the intracellular region 84 is filled with an aluminum-base metal after the immersion step and the bonding element is to be used to bond together nickel-base superalloys, this initial intracellular metal is replaced with an intracellular nickel-base superalloy that is similar to that of the blade 62 and the disk 64.

To accomplish the replacement, the bonding element preform resulting from the immersion step 28 immersed into a bath of the replacement liquid metal, such as nickel-base or copper-base alloys, or the replacement metal may be applied as a layer to the surface of the bonding element preform and then melted. The preform is maintained in the replacement liquid metal for a period of time, which depends upon the thickness of the composite material. This immersion allows diffusion to take place such that the aluminum is replaced by the liquid replacement metal from the bath. As an example, the aluminum/aluminum oxide composite material may be immersed in a nickel-base alloy for 8 hours at 1600° C. to effect the substantially complete replacement of the aluminum phase by the nickel-base alloy. A typical nickel-base alloy has a composition, in weight percent, of from about 1 to about 25 percent cobalt, from about 1 to about 25 percent chromium, from about 0 to about 8 percent aluminum, from 0 to about 10 percent molybdenum, from about 0 to about 12 percent tungsten, from about 0 to about 12 percent tantalum, from 0 to about 5 percent titanium, from 0 to about 7 percent rhenium, from 0 to about 6 percent ruthenium, from 0 to about 4 percent niobium, from 0 to about 0.2 percent carbon, from 0 to about 0.15 percent boron, from 0 to about 0.05 percent yttrium, from 0 to about 1.6 percent hafnium, balance nickel and incidental impurities.

In a second modification approach, numeral 34, the surface of the preform is processed to improve bondability, numeral 34. For example, the exposed surfaces of the ceramic region 82 and/or the intracellular region 84 may be mechanically roughened, as by shot peening, or chemically roughened with an appropriate etch. The exposed surfaces may be plated to reduce susceptibility to oxidation, as by nickel-plating. In a variation of this modification approach, the exposed metallic surfaces may be coated with a metal that reduces the melting point of the metal at the metallic surfaces, to promote the bonding. For example, in FIG. 3 the face 70 is coated with a modifying layer 94 by any operable approach for the nature of the modifying layer 94. The modifying layer 94 may be a braze material, or it could be a material that depresses the melting point of the metal in the intracellular region at the face 70. In the case of a nickel-base superalloy in the intracellular region, a boron-containing or silicon-containing modifying layer 94 may be applied to the face. The modifying layer 94 lies between the foam 80 and the element to which it is to be joined, in subsequent steps. When the bonding element is heated, the boron or silicon interdiffuses into the nickel-base superalloy and lowers its solidus temperature. Different modifying layers 94 may be applied to the different faces of the bonding element.

Either or both of the modification approaches 32 and 34 may be utilized in an situation.

An advantage of the present approach is that the size, shape, and/or dimensions of the bonding element 60, as well as its precursor structures, may be adjusted as necessary at any of several steps in the process. For example, the fired material of step 26, which is silica in the preferred embodiment, may be reshape or resized by glass shaping techniques or machining. After the contacting step 28, or the steps 30, 32, or 34, the bonding element may be coarse machined and/or fine machined to adjust its size and dimensions, or to add detail features.

The bonding element is now complete, and is used in a bonding procedure. A metallic first structure to be bonded, is furnished, numeral 36. The first structure is fabricated separately by a procedure that is specific to the nature of the first structure, and which does not form a part of the present invention. In the case of the application illustrated in FIG. 2, the first structure would be either the blade 62 or the disk 64.

The first structure and the bonding element are joined together, numeral 38. In an illustrated preferred approach, the first structure and the bonding element are contacted together with an applied pressure forcing them together, numeral 40. The assembly is heated to a bonding temperature at which the metal of the first structure and the metal of the bonding element may interdiffuse, numeral 42. The interdiffusion achieves a metallurgical bond between the first structure and the metal of the bonding element, with grain growth across the initial interface between the first structure and the bonding element. The bonding temperature may be below the solidus temperature of both metals, in which case the interdiffusion is accomplished by solid-state interdiffusion. This bonding temperature may instead be above the solidus temperature of one of the metals, in which case the interdiffusion is accomplished by liquid-state interdiffusion. Liquid-state interdiffusion is faster than solid-state interdiffusion in most cases, so that the bonding may be accomplished more quickly.

In some applications, it is preferred that the solidus temperature of the metal in the intracellular first region 84 is less than that of the metal of the first structure, and the bonding temperature is greater than the solidus temperature of the metal in the first region 84 and less than that of the metal of the first structure. To provide this capability, the composition of the metal in the first region 84 is selected to provide the lower solidus temperature. This approach is possible because the ceramic of the region 82 maintains the shape of the bonding element, even though the metal in the first region 84 is wholly or partially melted.

After the interdiffusion is complete, the bonded structure is cooled to room temperature, numeral 44, to complete the bonding.

In some cases, there is only a single joint to be completed, between the first structure and the bonding element. In most cases, there are two different joints to be completed. For example, to produce the bonded structure of FIG. 2, there is one joint between the bonding element 60 and the blade 62, and a second joint between the bonding element 60 and the disk 64. FIG. 1 also shows the formation of the second joint.

In the case where there is such a second joint, the second structure is furnished, numeral 46. A second joint between the second structure and the bonding element is formed, numeral 48. The joining 48 includes steps 50, 52, and 54, which are respectively similar to steps 40, 42, and 44 discussed earlier. The prior discussion is incorporated here.

When the bonding element is to be joined to two different structures and serve as the structural link between the two different structures, as in FIG. 2, it is sometimes desirable to provide two different intracellular metals in different portions of the second region. For example, in the foam 80 of FIG. 3 used as the bonding element 60 of FIG. 2, one face 74 is ultimately bonded to the blade 62, and another face 70 is ultimately bonded to the disk 64. The bonding element 60 may be provided with a first portion 90 adjacent to the face 74 (to be bonded to the blade 62) and a second portion 92 adjacent to the face 70 (to be bonded to the disk 64). The ceramic cell walls of the first region 82 are preferably the same in each of the portions 90 and 92. However, the intracellular region 82 of the first portion 90 may comprise a first metal, such as a first nickel-base superalloy optimized for bonding to the blade 62. The intracellular region 82 of the second portion 92 may comprise a second metal different from the first metal, such as a second nickel-base superalloy optimized for bonding to the disk 64. In other situations, the first metal of the first portion 90 and the second metal of the second portion 92 may be the same metal.

The joining steps 38 and 48 may be accomplished simultaneously or sequentially (i.e., serially one after the other). If they are performed sequentially, care is taken so that the second-performed joining step 48 does not result in de-bonding of the joint formed in the first-performed joining step 38.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A joining method comprising the steps of:
   providing a bonding element having a first portion formed of a first open-cell solid ceramic foam comprising ceramic first-portion cell walls, and
   an intracellular first-portion volume therebetween, the intracellular first-portion volume being filled with a bonding-element first-portion metal, wherein the step of providing the bonding element includes the steps of
   providing a piece of a sacrificial ceramic having the shape of the bonding element, and
   immersing the piece of the sacrificial ceramic in a reactive metal which reacts with the sacrificial ceramic to form an oxidized ceramic compound of the reactive metal and a reduced form of the ceramic, the resulting structure comprising the ceramic foam of the oxidized ceramic compound of the reactive metal with ceramic cell walls and the intracellular volume between the ceramic cell walls having a metallic reaction product therein;
   furnishing a first structure comprising a first-structure metal;
   joining the first structure to the bonding element, the step of joining the first structure to the bonding element including the substeps of
   contacting together the first structure and the first portion of the bonding element at a first bonding temperature greater than a solidus temperature of at least one of the first-structure metal and the bonding-element first-portion metal; and simultaneously interdiffusing the first-structure metal and the bonding-element first-portion metal to form a joined structure; and thereafter
   cooling the joined structure to room temperature.

2. The joining method of claim 1, wherein the first-structure metal and the bonding-element first-portion metal are each nickel-base superalloys.

3. The joining method of claim 1, wherein the step of contacting includes the step of
   forcing the first structure and the bonding element together with a compressive force.

4. The joining method of claim 1, wherein the intracellular first-portion volume comprises at least about 20 percent by volume of the first portion of the bonding element.

5. The joining method of claim 1, wherein the first bonding temperature is greater than the solidus temperatures of both the first-structure metal and the bonding-element first-portion metal.

6. The joining method of claim 1, including the additional steps of
   providing the bonding element having a second portion formed of a second open-cell solid ceramic foam comprising
   ceramic second-portion cell walls, and
   an intracellular second-portion volume therebetween, the intracellular second-portion volume being filled with a bonding-element second-portion metal;
   furnishing a second structure comprising a second-structure metal;
   joining the second structure to the bonding element, the step of joining the second structure to the bonding element including the substeps of
   contacting together the second structure and the second portion of the bonding element at a second bonding temperature greater than a solidus temperature of at least one of the second-structure metal and the bonding-element second-portion metal; and simultaneously
   interdiffusing the first-structure metal and the bonding-element first-portion metal to form a joined structure; and thereafter
   cooling the joined structure to room temperature.

7. The joining method of claim 6, wherein the steps of joining the first structure to the bonding element and joining the second structure to the bonding element are performed simultaneously.

8. The joining method of claim 6, wherein the steps of joining the first structure to the bonding element and joining the second structure to the bonding element are performed sequentially.

9. The method of claim 1, wherein the metallic reaction product is the same as the bonding-element first-portion metal.

10. The method of claim 1, wherein the metallic reaction product is not the same as the bonding-element first-portion metal, and wherein the method includes the additional step, after the step of immersing and before the step of contacting together, of
    replacing the metallic reaction product with the bonding-element first-portion metal.

11. The method of claim 1, including an additional step, after the step of
    providing an bonding element and before the step of joining the first structure, of modifying a surface of the bonding element.

12. The method of claim 1, wherein the ceramic cell walls comprise an oxidized form of a metal.

13. The method of claim 1, wherein the ceramic cell walls comprise aluminum oxide.

14. A joining method comprising the steps of:
    providing a bonding element having a first portion formed of a first open-cell solid ceramic foam comprising ceramic first-portion cell walls, the ceramic cell walls being an oxidized form of a metal, and an intracellular first-portion volume therebetween, the intracellular first-portion volume being filled with a bonding-element first-portion metal;

furnishing a first structure comprising a first-structure metal;

joining the first structure to the bonding element, the step of joining the first structure to the bonding element including the substeps of contacting together the first structure and the first portion of the bonding element at a first bonding temperature greater than a solidus temperature of at least one of the first-structure metal and the bonding-element first-portion metal; and simultaneously interdiffusing the first-structure metal and the bonding-element first-portion metal to form a joined structure; and thereafter cooling the joined structure to room temperature.

15. The method of claim 14, wherein the ceramic cell walls comprise aluminum oxide.

16. The joining method of claim 14, wherein the first-structure metal and the bonding-element first-portion metal are each nickel-base superalloys.

17. The joining method of claim 14, wherein the joined structure is a component of a gas turbine engine.

18. The joining method of claim 14, including the additional steps of providing the bonding element having a second portion formed of a second open-cell solid ceramic foam comprising ceramic second-portion cell walls, and an intracellular second-portion volume therebetween, the intracellular second-portion volume being filled with a bonding-element second-portion metal;

furnishing a second structure comprising a second-structure metal;

joining the second structure to the bonding element, the step of joining the second structure to the bonding element including the substeps of contacting together the second structure and the second portion of the bonding element at a second bonding temperature greater than a solidus temperature of at least one of the second-structure metal and the bonding-element second-portion metal; and simultaneously interdiffusing the first-structure metal and the bonding-element first-portion metal to form a joined structure; and thereafter cooling the joined structure to room temperature.

19. The joining method of claim 14, wherein the step of providing the bonding element includes the steps of providing a piece of a sacrificial ceramic having the shape of the bonding element, and immersing the piece of the sacrificial ceramic in a reactive metal which reacts with the sacrificial ceramic to form an oxidized ceramic compound of the reactive metal and a reduced form of the ceramic, the resulting structure comprising the ceramic foam of the oxidized ceramic compound of the reactive metal with ceramic cell walls and the intracellular volume between the ceramic cell walls having a metallic reaction product therein.

20. The method of claim 14, wherein the metallic reaction product is not the same as the bonding-element first-portion metal, and wherein the method includes the additional step, after the step of immersing and before the step of contacting together, of replacing the metallic reaction product with the bonding-element first-portion metal.

* * * * *